United States Patent [19]

Selcuk

[11] 4,236,383
[45] Dec. 2, 1980

[54] SOLAR ENERGY RECEIVER FOR A STIRLING ENGINE

[76] Inventor: Robert A. Frosch, Administrator of the National Aeronautics and Space Administration, with respect to an invention of M. Kudret Selcuk, La Canada, Calif.

[21] Appl. No.: 27,559

[22] Filed: Apr. 6, 1979

[51] Int. Cl.³ ............................................. F03G 7/02
[52] U.S. Cl. ..................................... 60/641; 60/524; 126/419
[58] Field of Search .................... 60/517, 524, 641; 126/419, 422

[56] References Cited

U.S. PATENT DOCUMENTS

| | | | |
|---|---|---|---|
| 3,203,167 | 8/1965 | Green, Jr. | 60/641 |
| 3,680,307 | 8/1972 | Michalec | 60/641 |
| 4,064,867 | 12/1977 | Schlesinger | 126/422 |
| 4,121,565 | 10/1978 | Grisbrook | 126/422 |
| 4,135,367 | 1/1979 | Frosch et al. | 60/641 |

FOREIGN PATENT DOCUMENTS 2006420 10/1978 United Kingdom .................... 126/419

Primary Examiner—Allen M. Ostrager
Attorney, Agent, or Firm—Monte F. Mott; John R. Manning

[57] ABSTRACT

A solar energy receiver including a separable endless wall formed of a ceramic material having defined therein a cavity of a substantially cylindrical configuration for entrapping solar flux, and an acceptance aperture adapted to admit to the cavity a concentrated beam of solar energy, said wall being characterized by at least a pair of contiguously related segments separated by lines of cleavage intercepting said aperture, at least one of the segments being supported for pivotal displacement, and a thermal-responsive actuator adapted to respond to excessive temperatures within the cavity for initiating pivotal displacement of said one segment, whereby thermal flux is permitted to escape from the cavity.

10 Claims, 3 Drawing Figures

SOLAR ENERGY RECEIVER FOR A STIRLING ENGINE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention:

The invention generally relates to energy converters and more particularly to an improved solar energy receiver particularly adapted to be mated with a Stirling engine for heating a working fluid conducted through a heat exchanger confined within the receiver, said receiver being of a separable configuration for reducing solar flux density in order to protect the heat exchanger.

As can be appreciated by those familiar with the design and operation of Stirling engines, such devices are particularly suited for utilizing solar energy in geographical areas which tend to enjoy an abundance of solar radiation. In order to more effectively utilize solar energy for powering Stirling engines, solar energy receivers often are provided for purposes of entrapping concentrated solar energy. It has been suggested that such receivers be provided with heat exchangers comprising so-called tube bundles consisting of a plurality of thin-wall tubes through which a working fluid is conveyed and thus passed through the receiver for accepting heat from the solar flux.

In practice, where the device comprises a cavity-type receiver characterized by a point focusing concentrator, it has been found that often the heat loads developed within the cavity, due to flux density, cannot be transferred to a working fluid passing through the tube bundles at a sufficiently high rate to avoid overheating. As a consequence, hot spots tend to develop in the tube walls which can and sometimes do lead to a malfunction of the system within which the receiver is employed.

The magnitude of temperatures attainable can readily be appreciated when it is recognized that solar powered systems which employ point focusing, cavity-type concentrators for powering Stirling engines optimally have a capability of withstanding pressures on the order of magnitude of 80 Atm and temperatures as high as 1400° F.

Attempts have been made to solve these and similar problems through the use of numerous devices such as heat pipes provided for coupling solar flux receivers to heat operated engines, as more fully described in application Ser. No. 824,024, filed Aug. 12, 1977, now U.S. Pat. No. 4,135,367. While the devices of the prior art may function satisfactorily for their intended purposes, it is apparent that improvements are required before totally satisfactory solutions are provided for the numerous and complex problems now facing designers of devices intended to utilize a solar source of energy.

It is, therefore, the general purpose of the instant invention to provide an improved solar energy receiver for use in combination with a Stirling engine, adapted to relieve the cavity of a receiver of excessive thermal flux loading in the event heat loads resulting from flux density cannot be transferred from the receiver to a working fluid at a sufficiently high rate necessary to protect the system within which the receiver is incorporated.

OBJECTS AND SUMMARY OF THE INVENTION

It is an object of the instant invention to provide an improved receiver for solar energy.

Another object is to provide for use in combination with a Stirling engine, an improved solar energy receiver characterized by temperature reduction means for reducing thermal flux density within the receiver.

It is another object to provide in combination with the Stirling engine a receiver having a cavity for housing therein a heat exchanger, an aperture for admitting a concentrated beam of solar energy, and means responsive to excessive temperatures for separating the walls of the receiver whereby the heat lost from the cavity is increased.

These and other objects and advantages are achieved through the use of a separable receiver characterized by an endless wall formed of a first insulating material, such as ceramic, and having defined therein an internal cavity of a substantial cylindrical configuration for housing a tube bundle coupled with a Stirling engine, an acceptance aperture adapted to admit a concentrated beam of solar energy to the cavity, a specular ring formed of a second ceramic material coaxially aligned with the aperture for uniformly distributing solar flux over the tube bundle and temperature responsive means for separating the receiver, whereby thermal flux is released, as will become more readily apparent by reference to the following description and claims in light of the accompanying drawings.

DESCRIPTION OF THE PREFERRED EMBODIMENT

Figure 1:
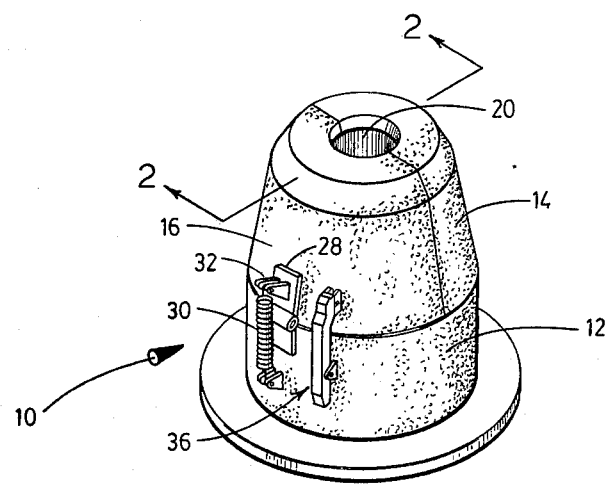
FIG. 1 is a perspective view of the receiver embodying the principles of the instant invention.

Referring now to the drawings, wherein like reference characters designate like or corresponding parts throughout the several views, there is shown in FIG. 1 a receiver embodying the principles of the instant invention.

As shown in the drawings, the receiver includes a housing 10 of a generally segmented construction. As shown, the housing 10 includes an annular base portion 12, surmounted by a generally tapered portion including a rigidly positioned body segment 14, and a pivotally supported body segment 16 disposed in mated relation with the segment 14. It is noted that the housing 10 is formed from a suitable material such as calcium silicate having a suitable insulating capability and that within the housing there is defined an internal cavity 18.

In order to accommodate acceptance of a concentrated beam of solar energy, by the cavity, an acceptance aperture, designated 20, is provided. As a practical matter, there is disposed within the cavity 18 a tube bundle 22 formed of individual tubes 22' connected with inlet and outlet manifolds, not designated, the purpose of which is to conduct a working fluid, such as helium gas, through the tubing whereby heat is transferred from the cavity to the working fluid to be utilized by a Stirling engine, not shown.

It should now be apparent that due to the material from which the housing 10 is fabricated, little heat is lost from the cavity 18 through conduction. Moreover, it is important to note that individual tubes 22' of tube bundles 22 are inclined at an appropriate angle and are so positioned as to surround a coneshaped manifold forming a head for a Stirling engine. Thus the surfaces exposed to solar thermal energy admitted to the cavity 18 are maximized for purposes of optimizing the rate of transfer of solar heat to the working fluid as it passes through the tube bundle.

Moreover, in order to more effectively and uniformly distribute the solar flux of the beam of energy admitted through the aperture 20, there is disposed within the cavity 18, in coaxial alignment with the aperture 20, a reflective surface 26 of a substantially annular configuration. In practice, the reflective surface comprises an inverted, truncated conical section fabricated from a suitable ceramic specular material. Through the use of the surface 26 it is possible to achieve a uniform distribution of the flux over the tube bundle 22. As a consequence of the distribution, the likelihood of burnout or malfunction resulting from hot spots occuring in the tube bundle is in large measure avoided.

It is particularly important to note that in order to relieve excessive thermal loading of the cavity 18, in those instances in which the solar heat cannot be transferred to the working fluid circulating through the tube bundle 22 at a sufficiently high rate, the moveable body segment 16 is supported for outward pivotal displacement, preferably by a suitable hinge 28. The hinge 28 is of any suitable design which serves to support the segment 16 for pivotal displacement relative to the base portion 12. It should now be apparent that displacement of the segment 16, away from the segment 14, effectively increases the area of the opening 20 from which long wave outgoing radiation emanates, in order that losses of energy from the cavity 18 is greately accelerated. Thus, temperatures within the cavity are reduced and burnout of the tubes 22' is prevented.

Figure 2:
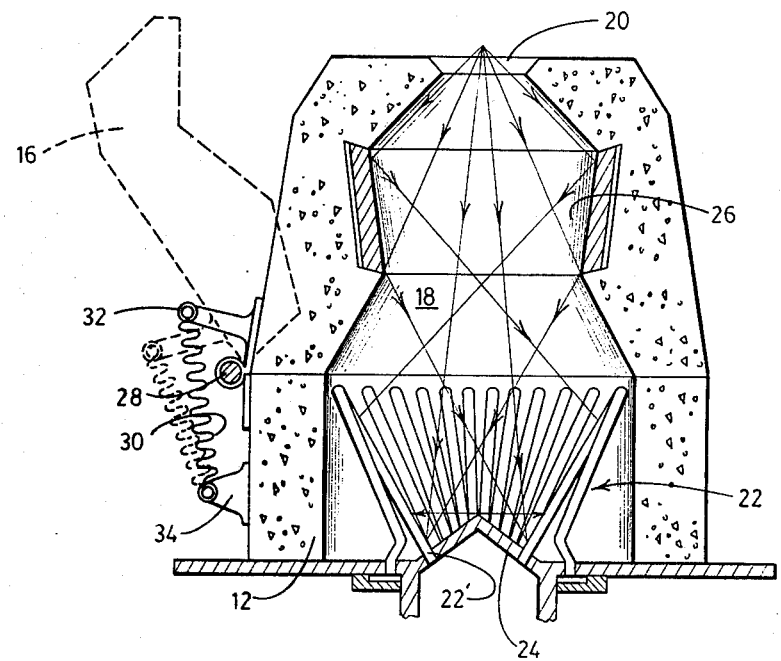
FIG. 2 is a cross sectional view taken generally along lines 2—2 in FIG. 1; displacement of a pivotal segment of the receiver to an aperture enlarging disposition being depicted by dashed lines.

Pivotal displacement of the segment 16, out of a face-to-face engagement with the rigidly supported segment 14 is achieved in response to the applied forces of a tension spring 30 connected between a bracket 32 affixed to the segment 16 and a bracket 34 mounted on the base portion 12 of the housing 10. Consequently, it should now be apparent that the moveable body segment 16 continuously is urged in pivotal displacement about the axis of the hinge 28 by means of the spring 30 and that, unless restrained against outward pivotal displacement, the segment 16 will be caused to assume the dashed line position illustrated in FIG. 2.

In order to secure the segment 16 of the housing 10 in mated relation with the rigid body segment 14, there is provided a thermal responsive latching mechanism, generally designated 36, arranged in close proximity with the spring 30. The latching mechanism 36, as shown, includes a latching arm 38 pivotally connected near one end thereof to a bracket 40, FIG. 3, mounted on the base portion 12 of the housing 10. In practice, the arm is connected to the bracket through a use of a suitable pivot connector pin 42. Affixed to the segment 16 there is a latch 44 which includes a throat 46, the purpose of which is to receive a latch pin 48 mounted on the latching arm 38 in spaced relation with the pin 42. It is to be understood that when the latch pin 48 is seated in the throat 46, the moveable segment 16 of the housing 10 is supported against pivotal displacement and thus is secured in mated relation with the rigidly supported segment 14 of the housing. However, once the pin 48 is extracted from the throat 46, the spring 30 urges the segment 16 in pivotal displacement outwardly from the segment 14, about the pin of the hinge 28, for opening the housing and thus increasing the area of the aperture 20. Preferably, the arm 38 is provided with a cantilevered segment, not designated, beneath which there is seated a compression spring 50. This spring in interposed between the latch arm 38 and the surface of the base portion 12 in order to continuously urge the arm 38 inwardly for purposes of assuring a mated relationship between the latch pin 48 and the latch throat 46.

Figure 3:
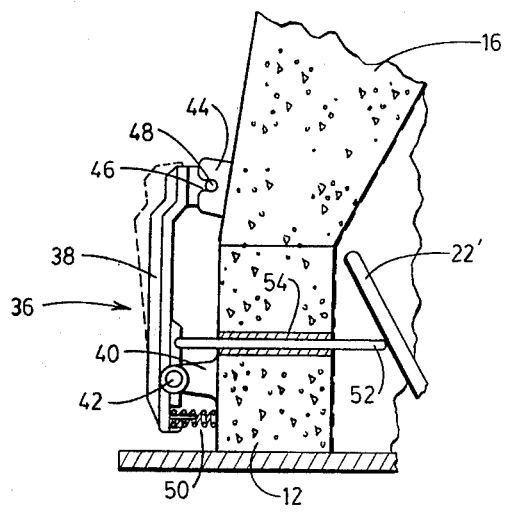
FIG. 3 is a fragmented view, on somewhat of an enlarged scale, of an actuator employed for releasably restraining the pivotal segment of the receiver against displacement.

It is here important to note that the latching mechanism 36 is released in response to excessive temperatures developed within the cavity 18. This is achieved through a use of an expansion rod 52 projected through a suitable bearing sleeve 54 formed in and projected radially through the wall of the base portion 12. The expansion rod 52 is connected at one end thereof in a heat transfer relation to the tube bundle 22 while being connected at its opposite end to the latching arm 38, as best illustrated in FIG. 3.

The expansion rod 52 is formed of a material characterized by a coefficient of linear expansion such that the rod, when heated to a predetermined temperature, elongates sufficiently for forcing the latching arm 38 to pivot outwardly about the pin 42 of the hinge 28 a distance such that the latch pin 48 is extracted from the throat 46. Thus the segment 16 is released for pivotal displacement. Since the particular material from which the expansion rod 52 is fabricated may be varied as desired, a detailed description thereof is omitted. Where so desired, a bi-metallic strip is employed for actuating the latching mechanism.

In any event, once the segment 16 is pivotally displaced outwardly with respect to the housing 10, escape of solar flux from the cavity 18 is accelerated.

OPERATION

It is believed that in view of the foregoing description, the operation of the disclosed embodiment of the invention is apparent, however, in the interest of completeness the operation will at this point briefly be reviewed.

With the receiver assembled in the manner aforedescribed, it is positioned at or near the focal point of a parabolic or similar solar energy concentrator, not shown. Such concentrators, generally, are well known in the art. The particular manner in which the housing 10 of the receiver is mounted on a Stirling heat engine is varied as desired.

Where so desired, the working fluid for the Stirling engine comprises helium gas having a nominal temperature of about 649° C. with a pressure range of from 40 to 80 Atm, while the normal thermal input load of 4Kw(t) is reflected from the concentrator.

As a beam of solar energy is accepted by the aperture 20, some of the rays are incident upon the tube bundle 22, as well as upon the head 24 of the Stirling engine. Other rays are reflected from the reflective surface 26 which serves to redirect and thus uniformly distribute the solar flux throughout the cavity 18 for thereby reducing the possibility of developing hot spots which, of course, can produce burnout of the tubes.

In the event the temperature in the cavity 18 increases above a desired level, the expansion rod 52 undergoes elongation and thus displaces the latching arm 38 outwardly against the applied force of the compression spring 50 for thereby removing the latch pin 48 from the latch 46. Upon the latch pin 48 being displaced from the throat 46, the spring 30 acts to pivotally displace the moveable segment 16 outwardly from the engagement with the segment 14, whereupon thermal energy is permitted to escape from the cavity 18 and thereby reduce the density of the flux to a suitable density. Once the receiver has "cooled down", the segment 16 is repositioned, manually, into engaged relation with the segment 14 and again secured in place by manipulating the latching mechanism 36.

In view of the foregoing, it should now be apparent that the receiver hereinbefore described provides a practical solution to the problem of reducing flux density within the cavity of a receiver for thereby avoiding malfunction of the receiver and its related components.

What is claimed is:

1. In combination with a Stirling engine characterized by a heat exchanger, a receiver comprising:
   A. means including an enclosure defining a cavity having an acceptance aperture for a concentrated beam of solar radiation and an internally reflective surface for flux distribution within said cavity; and
   B. flux density reduction means for reducing the density of radiation flux within the cavity including means for initiating an enlargement of said acceptance aperture in the presence of temperatures elevated above a selected magnitude.

2. A receiver as defined in claim 1 wherein said enclosure comprises a separable enclosure and the internally reflective surface includes a specular ring for reflecting solar energy accepted by said aperture toward said heat exchanger.

3. A receiver as defined in claim 1 wherein said heat exchanger includes a tube bundle for conducting a working fluid through the cavity and a Stirling engine head of a substantially conical configuration coaxially aligned with said aperture.

4. A receiver as defined in claim 2 wherein said separable enclosure includes a segmented wall comprising juxtaposed segments having lines of cleavage intercepting said apertures and said means for initiating enlargement of said acceptance aperture includes means connected to at least one segment of the wall for biasing said segment in displacement out of juxtaposition with respect to an adjacent segment of the wall, and latch means for releasably securing said segments in juxtaposed relation.

5. A receiver as defined in claim 4 wherein flux density reduction means further includes an expansion rod projected into said cavity and connected with said latch for actuating said latch in response to a temperature change within said cavity.

6. A receiver as defined in claim 5 wherein said ceramic specular ring is of an inverted truncated conical configuration coaxially related to said Stirling engine head.

7. An improved solar thermal energy receiver adapted to be mated with a Stirling engine and employed in heating the working fluid thereof comprising:
   A. an endless wall formed of a first ceramic material having defined therein an internal cavity of a substantially cylindrical configuration, an acceptance aperture for the cavity adapted to admit a concentrated beam of solar radiation and a specular ring formed of a second ceramic material coaxially aligned with the aperture for uniformly distributing solar radiation flux within the cavity, said wall being of a segmented construction and comprising a plurality of contiguously related segments separated by lines of cleavage intercepting said acceptance aperture, at least one of said segments being supported for pivotal displacement; and
   B. means for reducing flux density within said cavity including actuator means responsive to temperature changes within said cavity for initiating pivotal displacement of said one of the contiguously related segments, whereby said aperture is enlarged and solar radiation is permitted to escape from the cavity.

8. A receiver as defined in claim 7 wherein said actuator means includes a spring connected to said one segment of the contiguously related segments for urging the segment out of contiguous relation with at least one adjacent segment, actuatable latch means releasably restraining said one segment from displacement and adapted to release the one segment for pivotal displacement, and latch release means including an expansion rod projected from said cavity into engaged relation with said latch means for actuating said latch means in response to an increased change in the temperature within the cavity.

9. A receiver as defined in claim 8 wherein said first ceramic material comprises a relatively poor thermal conductive material.

10. A receiver as defined in claim 8 wherein said Stirling engine includes a heat exchanger comprising a tube bundle formed of a plurality of tubes disposed within the cavity, and a Stirling engine head of a substantially conical configuration, and said specular ring serves to distribute radiation flux uniformly across the surfaces of the tube bundle and engine head.

* * * * *